$U = \overline{abcp} + \overline{a\bar{b}\bar{c}p} + \overline{\bar{a}bcp} + \overline{\bar{a}\bar{b}cp}$

INVENTORS
WILLEM LE MAIR
JOHANNES B.H. PEEK
FREDERIK VALSTER
BY

AGENT

United States Patent Office 3,440,653
Patented Apr. 22, 1969

3,440,653
RADAR SYSTEM
Willem le Mair, Johannes Bernard Heinrich Peek, and Frederik Valster, Emmasingel, Eindhoven, Netherlands, assignors to U. S. Philips Corporation, New York, N.Y., a corporation of Delaware
Filed Apr. 29, 1968, Ser. No. 724,715
Claims priority, application Netherlands, Apr. 29, 1967, 6706096
Int. Cl. G01s 9/44, 9/04
U.S. Cl. 343—9          3 Claims

ABSTRACT OF THE DISCLOSURE

A radar system is provided with a signal processor which provides both range and radial velocity information without the use of Doppler filter banks thereby permitting ready microminaturization. The processor includes a multitap delay device which provides signals proportional to a delayed transmitted signal. The number of taps correspond to the number of range intervals to be measured. For each tap there is provided a plurality of correlator pairs each of which receives signals proportional to the delayed transmitted signal, the received signal, and a Doppler signal, there being a different Doppler signal for each correlator pair and the number of which corresponds to the number of expected Doppler frequencies. The outputs of the correlator pairs are supplied to summing devices and further processing circuitry including a threshold device. An output of a particular threshold device is an indication of a target radial velocity corresponding to the Doppler signal supplied to that threshold device's associated correlator pair.

---

Figure 1:
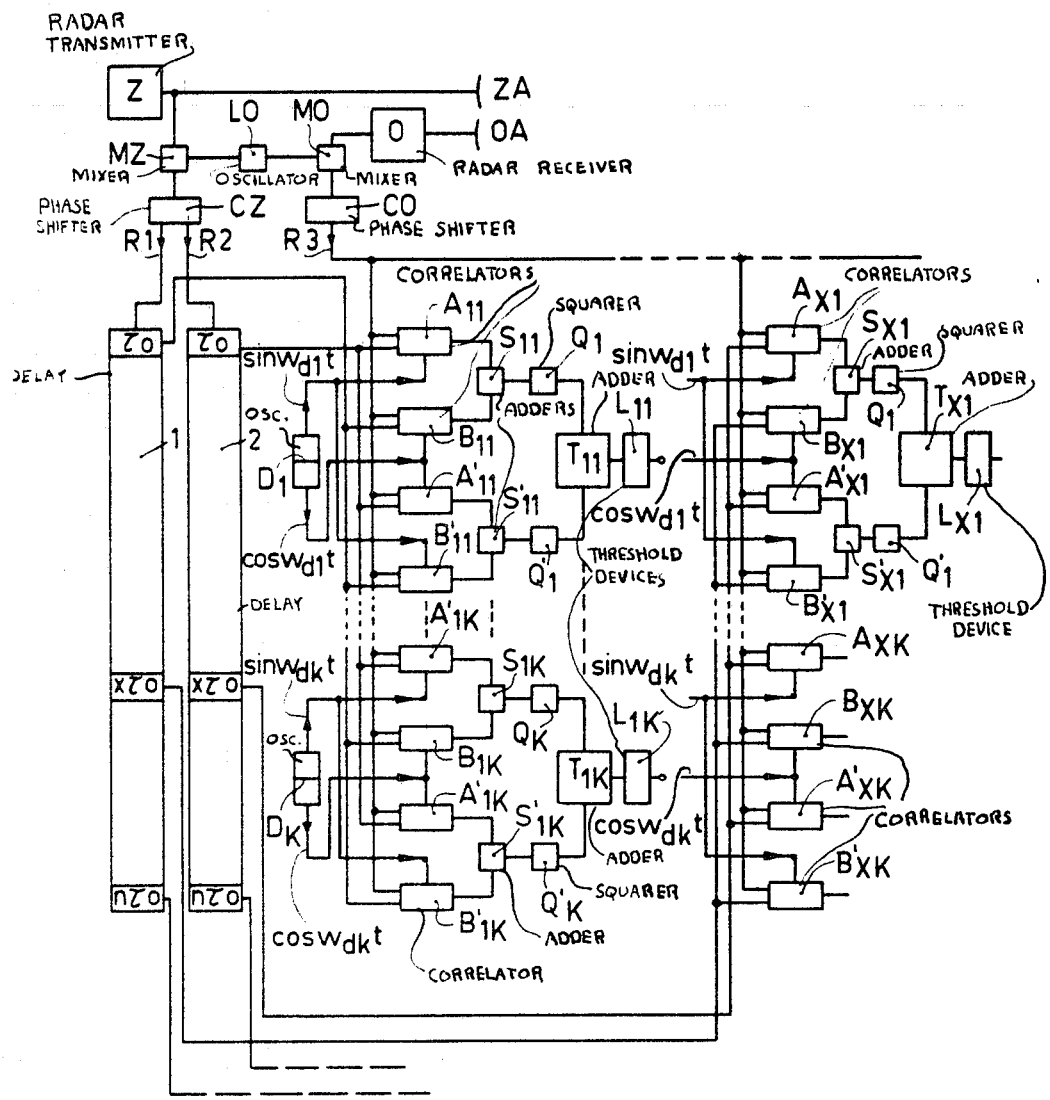

The invention relates to a radar system comprising a transmitter, a receiver and a detector stage in which a received signal, which is a transmitted signal reflected by a target, is processed to provide information about the range and the velocity of the target and which includes several pairs of correlators, a signal proportional to a delayed transmitted signal and a signal proportional to the received signal being applied to each correlator, and devices, one for each correlator pair, in which signals proportional to the output signals of the correlators are combined and applied to a threshold device. Such radar systems are known. A signal proportional to the transmitted signal is applied to a delay circuit which comprises several sections. At the output of each section there appears a signal which is proportional to the transmitted signal delayed by a given time. Depending upon the target range the received signal is delayed a certain time relative to the originally transmitted signal. In the correlators, the correlation between the delayed transmitted signal and the received signal is determined. A signal at the output of that correlator to which signals proportional to the transmitted and received signals are applied with the same delay provides an indication of the target range. In such radar systems, carrier phase variations must be eliminated. This may be effected by using a second delay circuit which is identical with the aforementioned delay circuit and to which is applied the signal which is proportional to which is applied the signal and shifted 90° in phase, so that at the output of the sections of this second delay circuit there appear signals proportional to the transmitted signal which is delayed by a certain time and is shifted 90° in phase. These latter signals also are applied to correlators to which the received signal is applied. Correlators to which signals of corresponding section outputs of the two delay circuits are applied form a correlator pair. The output signals of each correlator pair are squared in a squaring device, combined in a summation device and applied to a threshold device. In the sumation device, the undesirable carrier phase variation is eliminated owing to the property that $\sin^2 \varphi + \cos^2 \varphi = 1$.

Another possibility of eliminating the carrier phase variations consists in that instead of using a second delay circuit a signal proportional to the received signal and a signal proportional to the received signal but shifted 90° in phase are applied to respective correlators. These correlators again form correlator pairs, one pair for each section output of the delay circuit. The output signals of these correlator pairs otherwise are processed in the same manner as that described hereinbefore.

To obtain information on the velocity of the target the known radar systems of the above mentioned kind use the Doppler-frequency shift which the transmitted signal undergoes on reflection at a moving target. In order to detect this shift it is known for the multiplier of each correlator to be followed by the parallel combination of a set of band-pass filters. The band-pass filters are tuned to the various possible frequency shifts of the received signal and when on reflection at a moving target the received signal falls within the band of one of the filters, this filter is a measure of the target velocity.

The use of the said band-pass filters in such a radar system has large disadvantages, for a large number of such filters must be used which must be, and remain, exactly adjusted. In addition, these band-pass filters cannot readily be microminiaturized and they are not very flexible because the integrating time of a filter is related to its bandwidth. Finally, in a digital design of the above-mentioned detection device the band-pass filters cannot readily be digitized so that a more suitable solution is highly desirable.

The invention provides means of obviating the said disadvantages and consists in that each correlator pair is extended to comprise a first series of correlator pairs, $(A_{11}, B_{11}, A_{12}, B_{12}; \ldots; A_{1k}, B_{1k}; \ldots; A_{x1}, B_{x1}; \ldots; A_{nk}, B_{nk})$ and a second series of correlator pairs $(A'_{11}, B'_{11}; \ldots; A'_{1k}, B'_{1k}; \ldots; A'_{nk}, B'_{nk})$, the correlators being multiple correlators to which, in addition to a signal proportional to the delayed transmitted signal $(R_1, (R_2))$ and a signal proportional to the received signal $(R_3, (R'_3))$, a Doppler signal ($\sin \omega_{d1} t$, $\cos \omega_{d1} t$, $\ldots$, $\sin \omega_{dk} t$, $\cos \omega_{dk} t$) produced by oscillator $(D_1, \ldots D_k)$ is applied, a summation device $(S_{11}, \ldots, S_{x1}, \ldots; S'_{11}, \ldots, S'_{x1}, \ldots)$ being provided for each pair of correlators $(A_{11}, B_{11}, \ldots; A_{xk}, B_{xk}; \ldots; A'_{11}, B'_{11}, \ldots)$ whilst for each pair of summation devices $(S_{11}, S'_{11}; S_{1k}, S'_{1k}; \ldots; S_{xk}, S'_{xk}; \ldots)$ which follow correlator to which a Doppler signal at the same Doppler frequency $(\omega_{d1}, \ldots \omega_{dk})$ is applied there are provided devices $(Q_1, Q'_1, T_{11}; \ldots; Q_k, Q'_k, T_{1k}; \ldots; Q_k, Q'_k, T_{xk}; \ldots)$ in which signals proportional to the output signals of the summation devices $(S_{11}, \ldots)$ are combined and are applied to threshold devices $(L_{11}, \ldots, L_{1k}, \ldots, L_{x1}, \ldots L_{kx}, \ldots)$ which provide an indication of target velocity. The term "multiple correlator" is used herein to denote a correlator in which correlation between three or more signals takes place. The use of the multiple correlators eliminates the need for the aforementioned band-pass filters. The system in accordance with the invention may be used in radar systems using any kind of amplitude or frequency modulation. It may be both of the analog and of the digital type.

Figure 2:
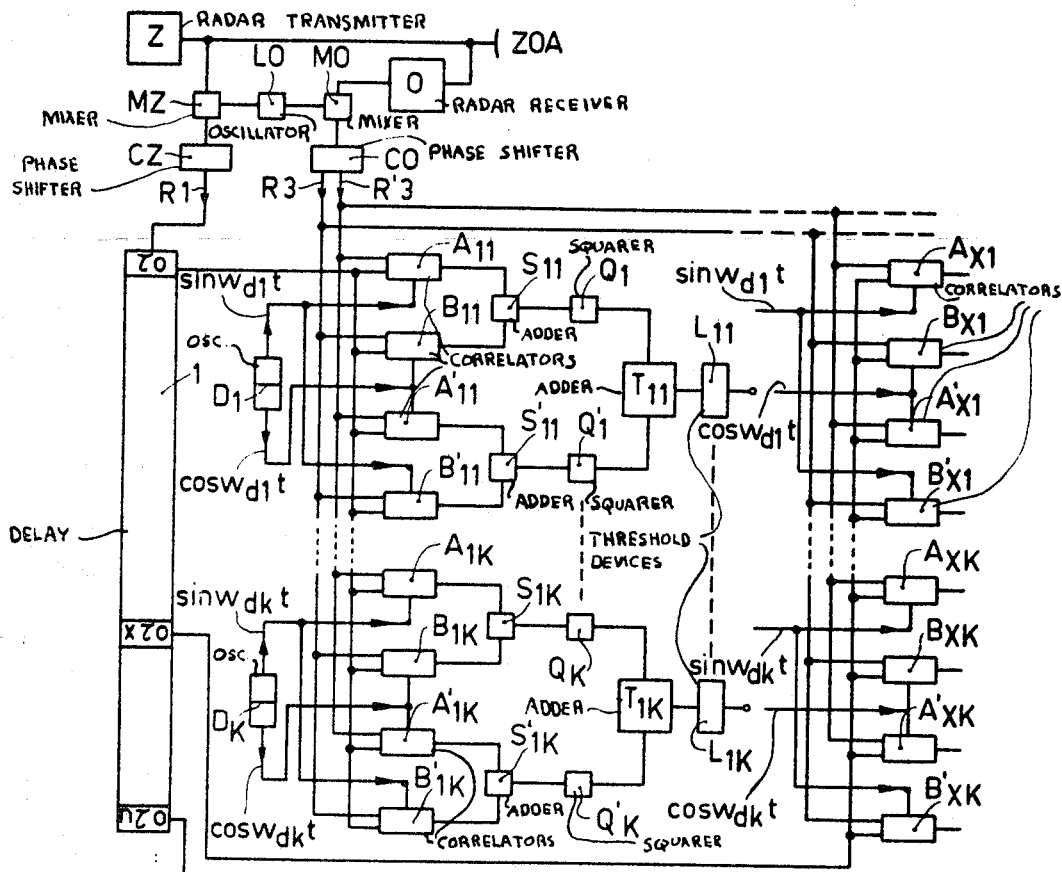
Figure 3:
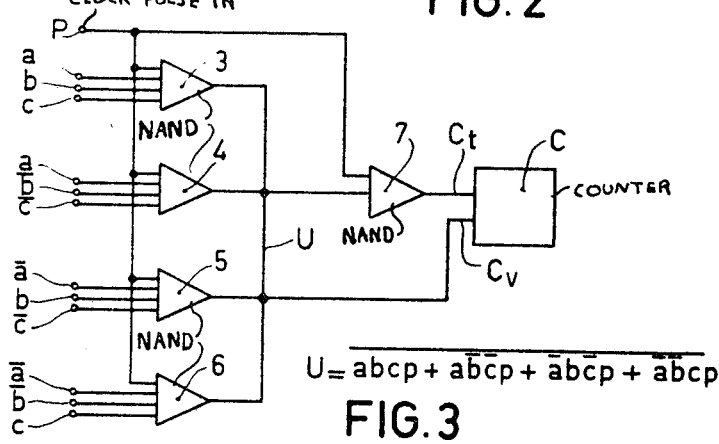

The invention will not be described more fully with reference to the accompanying diagrammatic drawings, in which FIGURES 1 and 2 are block diagrams of radar systems in accordance with the invention, and FIGURE 3 is an embodiment of a multiple correlator.

FIGURE 1 shows a radar system having two delay circuits 1 and 2, and FIGURE 2 shows a radar system having one delay circuit 1. Z is a radar transmitter, O a radar receiver, ZA a transmitting aerial, OA a receiving aerial, ZOA a combined aerial for transmission and reception in FIGURE 2. In devices MZ and MO the frequency of the transmitted and the received signal, respectively, can be converted down by means of a frequency of a local oscillator LO. At a device CZ, FIGURE 1, there appears a reference signal: $R_2 = R(t) \cos \{\omega_0 t + \theta(t)\}$ and a reference signal $R_2 = R(t) \sin \{\omega_0 t + \theta(t)\}$. These signals are proportional to the transmitted signal and are in quadrature. $\omega_0$ is the (converted down) carrier frequency. $R(t)$ and $\theta(t)$ represent amplitude and phase modulation, respectively. At a device CO there appears a signal $R_3$ proportional to the received signal. The delay circuits 1 and 2 have section outputs $\tau_0, 2\tau_0, \ldots, x\tau_0, \ldots, n\tau_0$. In the analog case the devices CZ and CO may be a filter including an additional 90° phase shifting network and a filter not including such a network, respectively. In the digital case these devices may be suitable analog-to-digital converters. At the said outputs $x\tau_0 (x=1, 2, \ldots, n)$ of the delay circuits 1 and 2 there appear signals $$R(t - x\tau_0) \cos \{\omega_0 (t - x\tau_0) + \theta(t - x\tau_0)\}$$

and $$R(t - x\tau_0) \sin \{\omega_0 (t - x\tau_0) + \theta(t - x\tau_0)\}$$

respectively.

The outputs $\tau_0, \ldots, x\tau_0, \ldots$ of the delay circuits 2 and 1 are connected to correlators $A_{11}, A_{11}', A_{12}, A_{12}', \ldots, A_{1k}, A_{1k}'; A_{21}, A_{21}', A_{22}, A_{22}', \ldots, A_{2k}, A_{2k}'; \ldots A_{x1}, A_{x1}', A_{x2}, A_{x2}', \ldots, A_{xk}, A_{xk}'; \ldots$; and $B_{11}, B_{11}', B_{12}, B_{12}', \ldots, B_{1k}, B_{1k}'; B_{21}, B_{21}', \ldots, B_{2k}, B_{2k}', \ldots, B_{x1}, B_{x1}', B_{x2}, B_{x2}', \ldots, B_{xk}, B_{xk}', \ldots$, respectively.

To these correlators is also applied the signal $R_3$ which is proportional to the received signal and has the form $$R_3 = \alpha R(t - x\tau_0) \cos \{(\omega_0 + \omega_{dj} t)(t - x\tau_0) + \theta(t - x\tau_0 + \varphi) + n(t)$$

where $\alpha$ represents an attenuation, $x\tau_0$ is the range information in the form of a delay time, and $\omega_{dj}$ is the velocity information in the form of a Doppler frequency, $\varphi$ is an undesirable phase angle due to the aforementioned carrier phase variation and $n(t)$ is a noise term. Finally there is applied according to the invention to each of the said correlators an auxiliary signal produced by oscillators $D_1, \ldots D_k$ in the form of a Doppler signal ($\cos \omega_{d1} t$, $\sin \omega_{d1} t, \ldots, \cos \omega_{dk} t, \sin \omega_{dk} t$). This is performed in a manner such that a Doppler signal $\sin \omega_{d1} t$ at Doppler frequency $\omega_{d1}$ is applied to the correlators $A_{11}$ and $B'_{11}$, a Doppler signal $\cos \omega_{d1} t$ at Doppler frequency $\omega_{d1}$ is applied to the correlators $A'_{11}$ and $B_{11}, \ldots$, a signal $\sin \omega_{d2} t$ at Doppler frequency $\omega_{d2}$ is applied to correlators $A_{1k}$ and $B'_{1k}$, a signal $\cos \omega_{d2} t$ at Doppler frequency $\omega_{d2}$ is applied to correlators $A'_{1k}$ and $B_{11}$, and so on. The outputs of the correlators $A_{11}, B_{11}, A'_{11}, B'_{11}$, etc., to which the same Doppler signals $\sin \omega_{d1} t, \cos \omega_{d1} t,$ etc. are applied are connected in pairs ($A_{11}, B_{11}; A'_{11}, B'_{11}$; etc.) in accordance with the corresponding outputs $\tau_0$ etc. of the first and second delay circuits (1 and 2) to summation devices $S_{11}, S'_{11}, S_{12}, S'_{12}, \ldots, S_{1k}, S'_{1k}, \ldots, S_{x1}, \ldots, S_{xk1}, \ldots, S_{xk}, \ldots$. The outputs of these summation devices $S_{11}, S'_{11}, \ldots, S_{nk}, S'_{nk}$ are connected to squaring devices $Q_1, Q'_1, \ldots, Q_k, Q'_k$, which in turn are connected in pairs $Q_1, Q'_1, Q_2, Q'_2; \ldots; Q_k, Q'_k$ according to corresponding Doppler frequencies $\omega_{d1}, \ldots, \omega_{dk}$ to summation devices $T_{11}, T_{12}, \ldots, T_{1k}; T_{21}, T_{22}, \ldots, T_{2k}; \ldots; T_{x1}, \ldots, T_{xk}; \ldots; T_{n1}, \ldots, T_{nk}$. The summation devices $T_{11}, T_{12}, \ldots T_{1k}$ are each connected to a threshold device $L_{11}, L_{12}, \ldots, L_{1k}, \ldots, L_{x1}, \ldots, L_{xk}$, respectively. The threshold devices $L_{11}, \ldots, L_{1k}, \ldots, L_{nk}$ determine which of the output signal values of the summation devices $T_{11}, \ldots, T_{nx}$ exceed a predetermined threshold value.

The operation of the above-described system including two delay circuits is as follows:

We will follow the processing of a received signal which is the reflection of a target which is at a distance corresponding to a delay $x\tau_0$ and has a velocity corresponding to a Doppler frequency shift $\omega_d$. This received signal has the form $$R_3 = \alpha R(t - x\tau_0) \cos \{(\omega_0 + \omega_{dj})(t - x\tau_0) + \theta(t - x\tau_0) + \varphi\} + n(t)$$

In the correlator $A_{xj}$ at the output $x\tau_0$ of the delay circuit 2 is produced the product $$R_3 \cdot R_2(t - x\tau_0) \cdot \sin \omega_{dj} t = [\alpha R(t - x\tau_0) \cos \{(\omega_0 + \omega_{dj})$$
$$(t - x\tau_0) + \theta(t - x\tau_0) + \varphi\} + n(t)] \cdot [R(t - x\tau_0)$$
$$\sin \{\omega_0(t - x\tau_0) + \theta(t - x\tau_0)\}][\sin \omega_{dj} t]$$
(I)

In the correlator $A'_{xj}$ of the pair $A_{xj}, A'_{xj}$ at the output $x\tau_0$ of the delay circuit 2 is produced the product $$R_3 \cdot R_2(t - x\tau_0) \cdot \cos \omega_{dj} t = [\alpha R(t - x\tau_0) \cos \{(\omega_0 + \omega_{dj})$$
$$(t - x\tau_0) + \theta(t - x\tau_0) + \varphi\} + n(t)] \cdot [R(t - x\tau_0)$$
$$\sin \{\omega_0(t - x\tau_0) + \theta(t - x\tau_0)\}][\cos \omega_{dj} t]$$
(II)

In the corresponding correlator $B'_{xj}$ of the output $x\tau_0$ of the delay circuit 1 is produced the product $$R_3 \cdot R_2(t - x\tau_0) \cdot \sin \omega_{dj} t = [\alpha R(t - x\tau_0) \cos\{(\omega_0 + \omega_{dj})$$
$$t - x\tau_0) + \theta(t - x\tau_0 + \varphi\} + n(t)]$$
$$\cdot [R(t - x\tau_0) \cos\{\omega_0(t - x\tau_0) + \theta(t - x\tau_0)\}][\sin d_j t]$$
(III)

In the correlator $B_{xj}$ of the pair $B_{xj}, B'_{xj}$ is produced the product $$R_3 \cdot R_1(t - x\tau_0) \cos \omega_{dj} t = [\alpha R(t - x\tau_0) \cos\{(\omega_0 + \omega_{dl})$$
$$(t - x\tau_0) + \theta(t - x\tau_0) + \varphi\} + n(t)] \cdot$$
$$[R(t - x\tau_0) \cos\{\omega_0(t - x\tau_0) + \theta(t - x\tau_0)\}][\cos \omega_{dj} t]$$
(IV)

The most probable signal value at the output of an integrator I succeeding a multiplier M of a correlator is the average of the product of the known terms of the signal equations which appears at the output of the correlator and about which the actual signal value fluctuates owing to the noise. By substituting $$|\overline{R^2(t)}| = \underset{T \to \infty}{\text{Lim.}} \frac{1}{T} \int_0^T R^2(t - x\tau_0) \, dt$$

in the Equations I, II, III and IV this expected value at the output of the integrators I of the correlators is:

$$A_{xj} : -R^2(t) \cdot \frac{\cos \varphi}{4}$$

$$A'_{xj} : -R^2(t) \cdot \frac{\sin \varphi}{4}$$

$$B_{xj} : -R^2(t) \cdot \frac{\cos \varphi}{4}$$

$$B'_{xj} : -R^2(t) \cdot \frac{\sin \varphi}{4}$$

The absolute values of these signals at the outputs of the correlators $A_{xj}$ and $B_{xj}$ are added in the additional summation device $S_{xj}$ to give $$|R^2(t)| \frac{\cos \varphi}{4} + |R^2(t)| \frac{\cos \varphi}{4}$$

and squared in the respective squaring device $Q_j$ to give $$\{|\overline{R^2(t)}|\}^2 \frac{1}{4} \sin^2 \varphi$$

The signals at the outputs of the correlators $A'_{xj}$ and $B'_{xj}$ are added in the additional summation device $S'_{xj}$ to give $$|R^2(t)| \frac{\sin \varphi}{4} + |R^2(t)| \frac{\sin \varphi}{4}$$

and squared in the respective squaring device to give $$\{|\overline{R^2(t)}|\}^2 \frac{1}{4} \sin^2 \varphi$$

In the summation device $T_{xj}$ the two squares are added to give:

$$= \frac{1}{4} \{|\overline{R^2(t)}|\}^2$$

and this signal value supplied to the threshold device $L_{xj}$. As will be seen, the undesirable phase modulation $\varphi$ has disappeared.

The same process takes place simultaneously in all the other correlators, etc. however, for the above signal example correlation takes place only in the said correlators $A_{xj}$, $A'_{xj}$, $B_{xj}$, $B'_{xj}$ and the said signal value $$\frac{1}{4} \{|\overline{R^2(t)}|\}^2$$

appears at the greatest of all the output signals of the series of correlator pairs $A_{x1}$, $X'_{x1}$ . . . $A_{xj}$, $A'_{xj}$ . . . $B_{x1}$, $B'_{x1}$ . . . $B_{xj}$, $B'_{xj}$ . . . at the output of the threshold device $L_{xj}$, which gives an indication "yes" or "no" (for example "1" and "0" respectively) according as the said signal value exceeds or does not exceed this threshold. Thus, for the value $x\tau_0$ as a measure of the target range, with sufficient signal strength the threshold device $L_x$ . . . responds. The velocity of the target is detected by the response of the threshold device $L_{xj}$ succeeding the correlator pairs $A_{xj}$, $A'_{xj}$ and $B_{xj}$, $B'_{xj}$ in the series $A_{x1}$ . . . $B'_{xk}$, to which is applied the Doppler frequency $\omega d_j$ corresponding to the Doppler shift due to the velocity of the moving target.

The system shown in FIGURE 2 differs from that shown in FIGURE 1 only in that instead of a signal $R_2$ shifted 90 in phase and derived from the transmitted signal a signal $R'_3$ appears which in the device CO is shifted 90° in phase relative to the signal $R_3$ proportional to the received signal.

To each correlator $A_{11}$, $B_{11}$ . . . $A'_{1k}$, $B'_{1k}$ succeeding the output $\tau_0$ of the delay circuit 1 is applied the delayed signal $R_1(t-\tau_0)$, (there is no delay circuit 2 in this embodiment), to each correlator $A_{x1}$ . . . $B'_{xk}$ following the output $x\tau_0$ of the delay circuit 1 is applied the delayed signal $R_1(t-x\tau_0)$, and so on. The signal $R_3$ is applied to all the correlators $A_{11}$, $A'_{11}$ . . . $A_{xk}$, $A'_{xk}$ . . . and the signal $R_3$ is applied to all the correlators $B_{11}$, $B'_{11}$ . . . $B_{xk}$, $B'_{xk}$ . . . . The operation of the system shown in FIGURE 2 corresponds to that of the system shown in FIGURE 1.

FIGURE 3 shows an example of a digital multiple correlator. It comprises four input nand-elements 3, 4, 5 and 6 to which are applied signals $a$, $b$ and $c$ or the inverse signals $\bar{a}$, $\bar{b}$ and $\bar{c}$, which are digital representations of the signal $R_1$, $R_2$ and $R_3$ or $R'_1$, $R'_2$ and $R'_3$ respectively, and $\sin \omega_{d1}t$, $\cos \omega_{d1}t$, etc., and a clock pulse signal $p$. The outputs of the nand-elements 3, 4, 5 and 6 are interconnected to produce a signal $$U = abcp + a\bar{b}cp + \bar{a}bcp + \bar{a}\bar{b}cp$$

This signal is identified with a "0" or a "1," depending on whether or not there is correlation between the signals $a$, $b$ and $c$ at the instants at which the clock pulse $p$ occurs. This signal U is applied to a counting device C in a manner such that the difference between the numbers of "0" signals "1" signals is continuously determined. For this purpose, the signal "1" may be applied to a forward counting input $C_v$ of a counter C, and the signal "0" through a nand-element 7 to a backward counting input $C_t$ of this counter C. The counter C is the integrating member of the digital multiple correlator described. The reading of the counter C is a measure of the correlation between the input signals $a$, $b$ and $c$. In the remainder of the systems shown in FIGURES 1 and 2 (digital design) the output values of the counting results are processed further in the summation devices $S_{11}$, $S'_{11}$, etc.

It will be appreciated that a radar system which exhibits such digital signal processing may be built with the aid of integrated circuits.

What is claimed is:

1. A radar system comprising a transmitter, a receiver and a detector stage in which a received signal, which is a transmitted signal reflected by a target, is processed to provide information on the range and velocity of the target and which includes a number of correlator pairs, a signal proportional to a delayed transmitted signal and a signal proportional to the received signal being applied to each correlator, whilst for each correlator pair there is provided a device in which signals proportional to the output signals of the correlators are combined and applied to a threshold device, characterized in that each correlator pair is extended to include a first series of correlator pairs ($A_{11}$, $B_{11}$; $A_{12}$, $B_{12}$; . . .; $A_{1k}$, $B_{1k}$; . . .; $A_{x1}$, $B_{x1}$; . . .; $A_{nk}$, $B_{nk}$) and a second series of correlator pairs ($A'_{11}$, $B'_{11}$; . . .; $A'_{1k}$, $B'_{1k}$; . . .; $A'_{nk}$, $B'_{nk}$), the correlators being multiple correlators to which are applied not only a signal proportional to the delayed transmitted signal ($R_1$,($R_2$)) and a signal proportional to the received signal ($R_3$,($R'_3$)) but also a Doppler signal ($\sin \omega_{d1}t$, $\cos \omega_{d1}t$, . . ., $\sin \omega_{dk}t$, $\cos \omega_{dk}t$) produced by oscillator ($D_1$, . . ., $D_k$), summation devices ($S_{11}$, . . ., $S_{x1}$, . . .; $S'_{11}$, . . . $S'_{x1}$, . . .) being provided, one for each pair of correlator ($A_{11}$, $B_{11}$; . . .; $A_{xk}$, $B_{xk}$; . . ., $A'_{11}$, $B'_{11}$, . . .), whilst for each pair of summation devices ($S_{11}$, $S'_{11}$, $S_{1k}$, $S'_{1k}$, . . ., $S_{xk}$, $S'_{xk}$, . . .) which follow correlators to which are applied Doppler signals at the same Doppler frequencies ($\omega_{d1}$, . . ., $\omega_{dk}$) are applied there are provided devices ($Q_1$, $Q'_1$, $T_{11}$; . . ., $Q_k$, $Q'_k$, $T_{1k}$; . . ., $Q_k$, $Q'_k$, $T_{xk}$; . . .) in which signals proportional to the output signals of the summation devices ($S_{11}$, . . .) are combined and applied to threshold devices ($L_{11}$, . . ., $L_{1k}$, . . ., $L_{x1}$, . . ., $L_{xk}$, . . .) which give an indication of target range and target velocity.

2. A radar system as claimed in claim 1, characterized in that a multiple digital correlator comprises four nand-elements (3, 4, 5, 6) to which the signals or their negations are applied, the combined outputs of the four nand-elements being connected to a counting device (C).

3. A radar system as claimed in claim 2, characterized in that the combined outputs of the four nand-elements are connected to a forward counting input ($C_v$) and, through a nand-element (7), to a backward counting input ($C_t$) of a two-way counter (C).

References Cited

UNITED STATES PATENTS

| | | | |
|---|---|---|---|
| 2,913,717 | 11/1959 | Brandon et al. | 343—9 X |
| 3,188,635 | 6/1965 | Blythe | 343—9 X |
| 3,205,496 | 9/1965 | Miedema | 343—9 X |
| 3,222,674 | 12/1965 | Villepelet | 343—9 |
| 3,315,258 | 4/1967 | Dillard | 343—5 |

RODNEY D. BENNETT, JR., *Primary Examiner.*

CHARLES L. WHITHAM, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,440,653            April 22, 1969

Willem le Mair et al.

It is certified that error appears in the above identified patent and that said Letters Patent are hereby corrected as shown below:

Column 2, line 2, "sumation" should read -- summation --. Column 3, line 9, "$R_2$" should read -- $R_1$ --; line 45, "term" should read -- term. --. Column 4, line 13, "[R" should read -- [αR --. Column 5, line 36, "90" should read -- 90° --.

Signed and sealed this 14th day of April 1970.

(SEAL)
Attest:

Edward M. Fletcher, Jr.           WILLIAM E. SCHUYLER, JR

Attesting Officer               Commissioner of Patents